US007391784B1

(12) United States Patent
Renkel (10) Patent No.: US 7,391,784 B1
(45) Date of Patent: Jun. 24, 2008

(54) METHOD AND SYSTEM FOR COMMUNICATING STATE INFORMATION BETWEEN DEVICES OF A COMMUNICATIONS NETWORK

(75) Inventor: James A. Renkel, Warrenville, IL (US)

(73) Assignee: 3Com Corporation, Marlborough, MA (US)

( * ) Notice: Subject to any disclaimer, the term of this patent is extended or adjusted under 35 U.S.C. 154(b) by 1054 days.

(21) Appl. No.: 10/334,702

(22) Filed: Dec. 30, 2002

(51) Int. Cl.
*H04L 12/66* (2006.01)
*H04J 3/14* (2006.01)
(52) U.S. Cl. .................. 370/401; 370/352; 375/222
(58) Field of Classification Search .............. 370/252, 370/352, 401–404, 449; 375/222; 709/227–229; 714/748–749
See application file for complete search history.

(56) References Cited

U.S. PATENT DOCUMENTS

| | | | | |
|---|---|---|---|---|
| 6,493,334 B1 * | 12/2002 | Krzymien et al. | ........... | 370/342 |
| 6,757,367 B1 * | 6/2004 | Nicol | .............. | 379/90.01 |
| 7,058,085 B2 * | 6/2006 | Earnshaw et al. | ........... | 370/473 |
| 7,149,224 B1 * | 12/2006 | Krishnamurthy | ........... | 370/401 |

OTHER PUBLICATIONS

International Telecommunication Union (ITU-T), "Modem-Over-IP Networks—Foundation", ITU-T Recommendation V.150.0 (V.MoIP-f); Oct. 15-25, 2002.
International Telecommunication Union (ITU-T), "Procedures For the End-To End Connection of V-Series DCES Over An IP Network", ITU-T Recommendation V.150.1; Oct. 15-25, 2002.
Internet Engineering Task Force (IETF), Requests For Comments (RFC) 1889, "RTP: A Transport Protocol For Real-Time Applications", Jan. 1996.
Internet Engineering Task Force (IETF), Requests For Comments (RFC) 793, "Transmission Control Protocol; DARPA Internet Program Protocol Specification", Sep. 1981.
Internet Engineering Task Force (IETF), Requests For Comments (RFC) 768, "User Datagram Protocol", Aug. 28, 1980.
International Telecommunication Union (ITU-T), "Pulse Code Modulation (PCM) of Voice Frequencies", ITU-T Recommendation G.711; 1988, 1993.
International Telecommunication Union (ITU-T), "Coding of Speech At 8 kbits/s Using Conjugate-Structure Algebraic-Code-Excited Linear-Prediction (CS-ACELP)", ITU-T Recommendation G.729; 1996.

(Continued)

*Primary Examiner*—Chau Nguyen
*Assistant Examiner*—Marcus R Smith
(74) *Attorney, Agent, or Firm*—McDonnell Boehnen Hulbert & Berghoff (57) ABSTRACT

A method and system of communicating state information between devices of a communications network is provided. A gateway of a packet network may change operating states during transmission of packets to another gateway. The gateway may indicate the state change to the receiving gateway by sending a burst of messages to the receiving gateway. If the gateway does not respond to any of these messages, the gateway may then send another message to the receiving gateway, which requires the receiving gateway to respond. Or, the gateway may send individual messages to the receiving gateway for a desired amount of time and, if the receiving gateway does not respond to any of these, then the gateway may again send the must respond message to the receiving gateway.

20 Claims, 8 Drawing Sheets

OTHER PUBLICATIONS

International Telecommuncation Union (ITU-T), "Dual Rate Speech Coder For Multimedia Communications Transmitting at 5.3 and 6.3 kbit/s", ITU-T Recommendation G.723.1; 1996.

International Telegraph and Telephone Consultative Committee (CCITT), "General Aspects of Digital Transmission Systems; Terminal Equipments: 40,32,24, 16 kbits/s Adaptive Differential Pulse Code Modulation (ADPCM)", CCITT Recommendation G.726; 1990.

Internet Engineering Task Force (IETF), Requests For Comments (RFC) 2833, "RTP Payload For DTMF Digits, Telephony Tones and Telephony Signals", May 2000.

Internet Engineering Task Force (IETF), Requests For Comments (RFC) 791, "Internet Protocol: DARPA Internet Program Protocol Specification", Sep. 1981.

International Telecommunication Union (ITU-T), "Series T: Terminals For Telematic Services: Procedures For Document Facsimile Transmission In The General Switched Telephone Network", ITU-T Recommendation T.30; 2000.

International Telecommunication Union (ITU-T), "Series T: Terminals For Telematic Services: Procedures For Real-Time Group 3 Facsimile Communication Over IP Networks", ITU-T Recommendation T.38; 2002.

International Telecommunication Union (ITU-T), "1200 Bits Per Second Duplex Modem Standardized For Use In The General Switched Telephone Network and On Point-To-Point 2-Wire Leased Telephone-type Circuits", ITU-T Recommendation V.22, 1988, 1993.

International Telecommunication Union (ITU-T), "A Family of 2-Wire, Duplex Modems Operating At Data Signalling Rates Of Up To 9600 bit/s For Use On The General Switched Telephone Network and On Leased Telephone-Type Circuits", ITU-T Recommendation V.32; 1993.

International Telecommunication Union (ITU-T), "A Modem Operating At Data Signalling Rates Of Up To 28 800 bit/s For Use On the General Switched Telephone Network and On Leased Point-To-Point 2-Wire Telephone-Type Circuits", ITU-T Recommendation V.34; 1994.

International Telecommunication Union (ITU-T), "Procedures For Starting Sessions Of Data Transmission Over the General Switched Telephone Network", ITU-T Recommendation V.8; 1994.

International Telecommunication Union (ITU-T), "A Digital Modem Operating At Signalling Rates Of Up To 64 000 bit/s For Use On a 4-Wire Circuit Switched Connection and On Leased Point-To-Point 4-Wire Digital Circuits", ITU-T Recommendation V. 91; 2000.

International Telecommunication Union (ITU-T), "A Digital Modem and Analogue Modem Pair For Use On the Public Switched Telephone Network (PSTN) At Data Signalling Rates of Up To 56 000 bit/s Downstream and Up To 33 600 bit/s Upstream", ITU-T Recommendation V.90; 1999.

International Telecommunication Union (ITU-T), "Enhancements To Recommendation V.90", ITU-T Recommendation V.92; 2001.

* cited by examiner

METHOD AND SYSTEM FOR COMMUNICATING STATE INFORMATION BETWEEN DEVICES OF A COMMUNICATIONS NETWORK

FIELD OF INVENTION

The present invention relates to state communications and, more particularly, to a method and system of reliably communicating state information between devices or entities of a communications network.

BACKGROUND

One of the major challenges within a telecommunication network is the delivery of broadband communications over the network to specific receivers or customers in a cost-efficient, timely, and effective manner. Two endpoints may send and receive information through entities of the telecommunication network. For example, a user of a computer may communicate with another user of another computer through the network. Or, as another example, a server may communicate with a process controller through the network to receive instructions from the controller. The network may not initially know what type of communication session to establish between the two endpoints. The type of communication session depends on the type of endpoints communicating through the network. As a result, the network may begin the communication session as a default type and later decide whether the type of session should be changed.

As an example, a customer may desire to fax an order for supplies to its supplier. The customer may begin a session through the network with another facsimile machine. The network may initially establish the session as an audio session, either by a random choice or because most entities communicating through the network desire a voice communication session. And upon receiving data from the first facsimile machine, the network may then realize that this is not an audio call, and subsequently may modify the communication session to be a facsimile relay session.

In the example above, each facsimile machine probably communicates with a separate transmission entity of the network, such as a gateway. And when the network switches between types of communication sessions, it is necessary for both gateways to know what type of communication session is currently being used or what state the "other" gateway is in so that both gateways can synchronize the transmission of voice or data. Synchronization of the transmission may also be necessary since separate payload data packet types are used even if the underlying encoding is the same (e.g. voice and voiceband data encoding each may use Pulse Code Modulation μ-law ("PCMU")). Each payload type associated with a different encoding can have a separate format; therefore, it is desirable that the two gateways comprising the communication session be in synchronization of encoding formats.

One existing method of synchronizing transmission entities of the network is through the use of the User Datagram Protocol ("UDP"), which is a packet format included in the Transmission Control Protocol ("TCP") suite and used for short user messages and control messages. However, transmission of messages using the UDP is unacknowledged and, therefore, there is no guarantee that the messages will be received. And since data packets are frequently lost within the network, one gateway may continue transmitting information in an audio format because the gateway was never informed that the communication session has been changed to a facsimile relay session. This may cause a problem since the other gateway will be looking to receive data in the form of a facsimile relay session and, therefore, may not recognize the audio formatted data.

As an alternative to using UDP, the TCP can be used to deliver the state information. However, TCP can waste bandwidth since TCP will unnecessarily transmit all state information and will transmit data during inactive periods. For example, the two gateways only need to know the current state in order to properly transmit data. But, using TCP, all intermediate state information is included within the state information transmission. So if the gateways initially began communicating in an audio format, then switched to a Voice Band Data ("VBD") mode for a modem communication session, and then finally switched to the proper facsimile relay session, the TCP protocol will transmit information informing the gateways of this sequence of state transitions. Therefore, much bandwidth is wasted since more than the necessary information is transmitted because TCP will even continue to deliver previous, undelivered state changes, when only the last state change is relevant. Another limitation to TCP is that TCP only transmits information when requested to do so. Presumably, if no state transition has occurred, there will not be a request to transmit state information, and no network resources will be used.

Another protocol that may be used is the Datagram Congestion Control Protocol ("DCCP"). This protocol, like UDP, trades reliability for fast transmission. However, unlike UDP (but similar to TCP), it was designed to be "friendly" to congested networks in the sense that it will not aggravate congestion. Unfortunately, this protocol is designed to implement a congestion-controlled, unreliable flow of datagrams suitable for use by applications such as streaming media or Internet games.

Other protocols or methods are also available. However, no protocol reliably transmits state information without wasting precious bandwidth. As another example, state information could be transmitted a fixed number of times hoping that at least one transmission would be successful. Of course, this method would also waste bandwidth if the first transmission was successful and it would be unknown whether any of the transmissions were successful. Consequently, a reliable protocol that uses bandwidth conservatively is desirable.

SUMMARY

Generally speaking, the present invention provides a mechanism to update state information for any two (or more) entities of a packet network. In an exemplary embodiment, a method of communicating information between a first entity and a second entity is provided. The method includes sending a first message from the first entity to the second entity and, if after a first time interval, no confirmation message has been received by the first entity from the second entity, resending the first message from the first entity to the second entity. The method further includes continuing to send the first message from the first entity to the second entity until a confirmation message has been received by the first entity from the second entity. The method also includes, if after a second time interval expires and no confirmation message has been received by the first entity from the second entity, sending a second message from the first entity to the second entity requiring the second entity to respond. The method further includes if during any of the previous steps a second message is available before the confirmation message has been received by the first entity, sending the first message is abandoned and instead the first entity sends the second message in accordance with the above steps.

In another respect, the exemplary embodiment may take the form of a method of indicating a state transition of a first gateway to a second gateway, which each communicate through a data packet network. The method may include sending a first burst of state update messages from the first gateway to the second gateway. Each state update message may be indicative of a current state of the first entity. The method may further include after a timeout period, if the second gateway has not responded to one of the state update messages from the first burst, sending a second state update message from the first gateway to the second gateway. The second state update message may require that the second entity respond.

In still another respect, the exemplary embodiment may take the form of a system that includes a first entity and a second entity in communication with the first entity. The first entity may send a burst of messages to the second entity. If after a timeout period, the second entity has not responded, the first entity then may send a message to the second entity that requires the second entity to respond.

Embodiments of the present invention may provide a technique to indicate state transitions, not limited to synchronizing network elements. Note that the states of two network elements do not need to be identical, although in the case of Modem over Internet Protocol ("MoIP") gateways, for example, this may be required.

The methods of the present invention describing the reliable state update protocol may be used in any instance where two entities are required to inform each other of any type of state information. This protocol has many advantages for use by gateways in a packet-switched network. However, other entities that operate according to a state transition model can achieve advantages using this protocol as well.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

Figure 1:
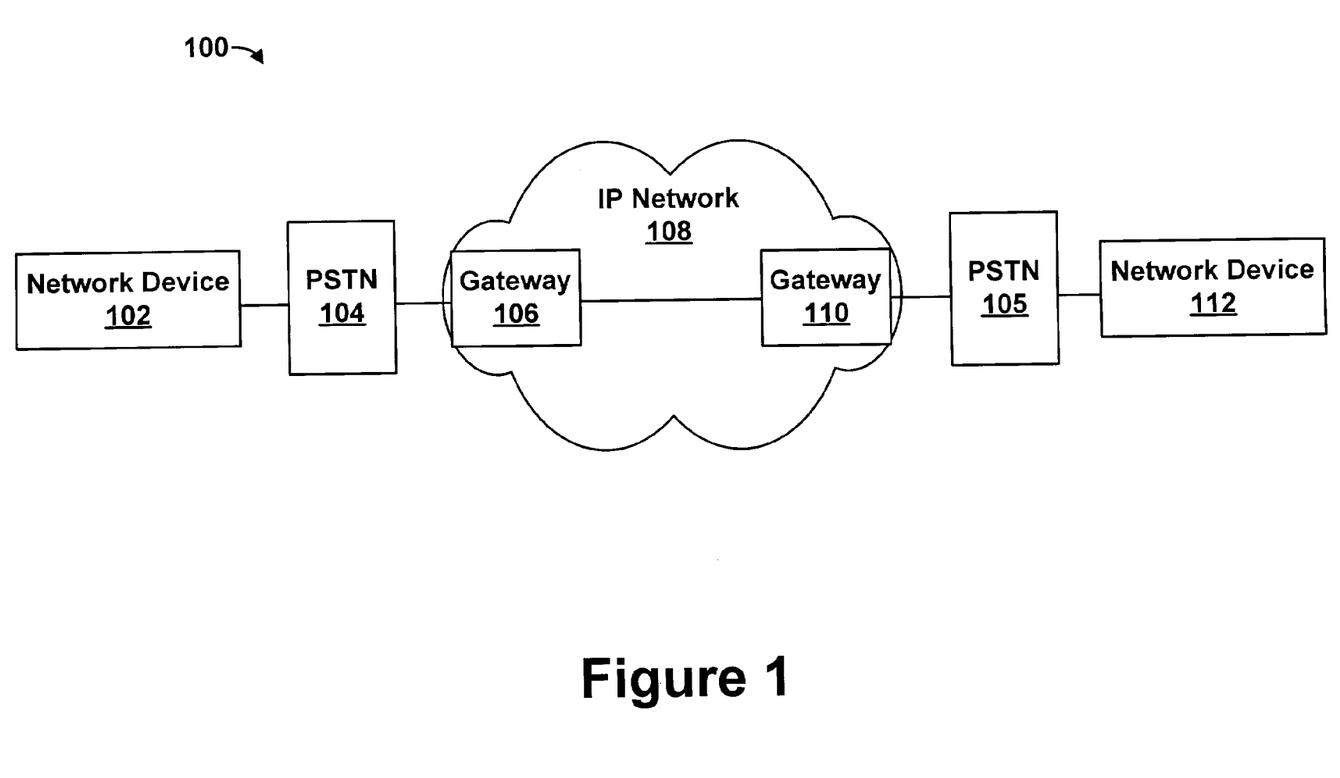
FIG. 1 is a block diagram illustrating one embodiment of a communications network that may operate according to the present invention.

Referring now to the figures, and more particularly to FIG. 1, a block diagram of one embodiment of a communications network 100 is illustrated. It should be understood that the system 100 illustrated in FIG. 1 and other arrangements described herein are set forth for purposes of example only, and other arrangements and elements can be used instead and some elements may be omitted altogether, depending on manufacturing and/or consumer preferences.

By way of example, network 100 includes a network device 102 coupled through a Public Switched Telephone Network ("PSTN") 104 to a gateway 106 of an Internet Protocol ("IP") network 108. The gateway 106 couples to another gateway 110, which establishes a communication session through a PSTN 105 to another network device 112. (PSTN 104 and 105 could also be the same network). Each of the couplings within the network 100 may be an interface such as a trunk level 1 (T1) line, an Ethernet line, a signaling link, or other connections (whether wired or wireless).

The network devices 102 and 112 illustrated in FIG. 1 represent entities that may communicate using the network 100, therefore the communication devices may represent a modem, a facsimile machine, a data network telephone, a computer, or other devices that may communicate over the network 100.

The IP network 108 represents any transport data packet network. Therefore, the IP network 108 may be arranged in any desired format such as a Wide Area Network ("WAN") or a Local Area Network ("LAN"), or may provide connectivity to such networks.

The gateways 106 and 110 operate to receive information from network devices 102 and 112, packetize the information, and send the data packets through the IP network 108. The gateways 106 and 110 may be Voice over IP (VoIP) gateways, which sample incoming audio signals to transmit audio data packets over the IP network 108. The gateways 106 and 110 may also be MoIP gateways or any network communication devices that communicate with each other.

As an example of establishing a communication session between the devices 102 and 112, assume network devices 102 and 112 are modems. Initially, when network device 102 begins transmitting data to the IP network 108 intended to be received by the end network device 112, the gateway 106 that receives the data from network device 102 does not know that network device 102 desires to establish a modem-modem communication session. Therefore, the gateway 106 may initially establish an audio mode communication session as the starting state, based on a default setting or because most calls that are routed through the gateway 106 may be analog audio calls. However, the gateway 106 may start in a different state as well.

Figure 2:
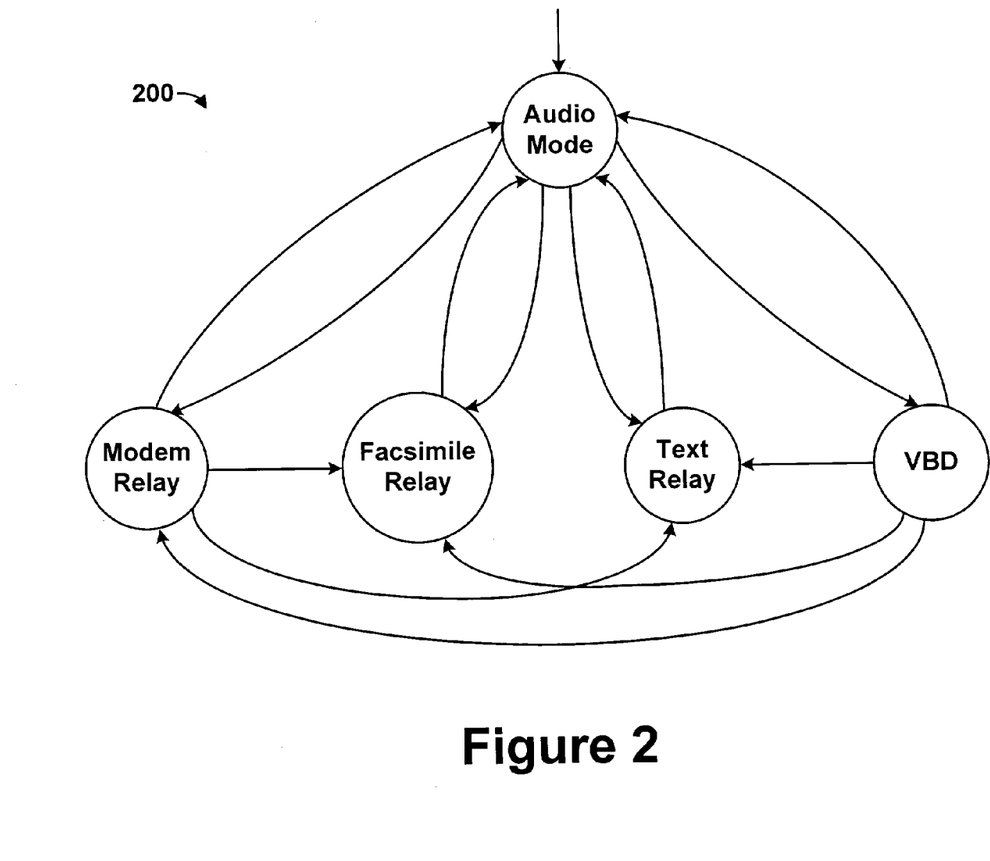
FIG. 2 is one embodiment of a state transition diagram illustrating possible operation of the communications network of FIG. 1.

FIG. 2 is state transition diagram 200 illustrating one embodiment of operation of the communications network 100. As shown, when a call is received at gateway 106, an audio mode communication session is initially established. It should be understood, however, that the network's state machine may start at a different state and may contain more or fewer states than are illustrated in the diagram 200. Also, the states of the network's state machine can be encoded as an integer value, with the state machine initially in state "0," which may correspond to the audio mode, for example. Depending on the number of states in the network's state machine, the states can be represented by binary integer values as well.

The audio mode may be used as a default starting state simply as a default choice or because most calls routed through the network 100 are audio calls. The audio mode is typically established for analog telephone calls.

Gateway 110 may receive data from gateway 106 and send the data to the addressed recipient network device 112. The gateway 110 may recognize that a modem-modem session is desired once it receives an answer tone from network device 112 after sending data that the gateway 110 received from gateway 106 to network device 112. The gateway 110 may then inform the gateway 106 that the communication session should be updated to the VBD mode. In one embodiment, the gateway 110 may inform gateway 106 using a Reliable State Update Protocol (referred to hereinafter as "RSUP") (more fully described below). VBD is mainly used when highly reliable data transmission is desired. VBD is data (e.g., fax or modem) transmitted as audio using an audio coder-decoder ("CODEC"), such as a Pulse Code Modulation A-law ("PCMA") or a PCMU codec.

However, as shown in the diagram 200, once in the VBD mode, the gateways may transition to the modem relay mode, or if the gateways made a mistake in switching away from the audio mode, the gateways may also transition back to the audio mode. The gateways may desire to use the modem relay mode to more efficiently transmit data through the IP network 108. The modem relay mode differs from the VBD mode because only significant information is transmitted using the modem relay mode. For example, using the VBD mode, data is received at gateway 106 on a continuous basis from network device 102, packetized, and sent to the gateway 110. And in modem relay mode, data is still received at gateway 106 on a continuous basis, however, the gateway 106 will demodulate the data from the network device 102 and only packetize significant data to be sent to the gateway 110. In this manner, when the network device 102 sends idle data to the gateway 106, such as when the network device 102 is used to connect to the Internet and the communication device is currently inactive (e.g., not requesting data or sending data to the IP network 108), the gateway 106 will recognize that the data it received from network device 102 is idle data since the gateway 106 demodulates data received from the network device 102. As another example, in the modem relay mode, network capacity may not be consumed if there is not an active transmission taking place such as when a caller is put on hold. In contrast, in the VBD mode, the gateway 106 will receive stale data, packetize the stale data, and send it to gateway 110.

It is likely that in the above example, the modem relay mode would be most desirable for the modem-modem call. However, if a different communication device was using the network 100 to transmit and receive data, then the network 100 may continue to transition through the various modes of the diagram 200 until the proper mode is found. For example, if a facsimile machine was transmitting data through the network 100, then the network 100 may transition from the VBD mode to a facsimile relay mode, or the network may switch directly to the facsimile relay mode from the audio mode.

The facsimile relay mode is preferable to use for transmitting facsimile messages. The facsimile relay mode is similar to the modem relay mode, except the facsimile relay mode may be exclusively for use by communication devices transmitting fax data. From the facsimile relay mode, the network 100 can also transition back to the audio mode.

The gateways may also transition from the VBD to a text relay mode. The text relay mode can be used to transmit information to communication devices designed to display text, such as for devices that have no speakers or for users of devices who cannot hear. From the text relay mode, the network 100 can also transition back to the audio mode.

Also, if the gateways transition to the modem relay mode (either from the VBD mode or from the audio mode), they may also transition back to the audio mode thereafter, or transition to either the facsimile relay mode or the text relay mode as well.

The state transition diagram 200 illustrates various states that the network 100 may transition into defining the type of communication session established between the gateways 106 and 110, and defining the manner in which data is transmitted between the gateways 106 and 110. It may be important that both gateways 106 and 110, i.e., the gateways through which the network devices 102 and 112 communicate, are synchronized at all times throughout a communication session because it could be desirable for both gateways 106 and 110 to transmit data using the same communication type, or for both gateways 106 and 110 to be in the same state. Therefore, if one of the gateways transitions into a new state, then that gateway should notify the other gateway of the state transition. However, using existing protocols, the gateways 106 and 110 cannot efficiently arrive at consistent conclusions of each other's current state. If no notification is received, then the transmission of data may become unreliable since the gateways will transmit and receive data using different modes.

In one embodiment, the gateways 106 and 110, or any transport entity on the IP network 108, may reliably communicate state information with each other using the RSUP. The RSUP reliably delivers the current value of the state of the network's 100 state machine between the gateways 106 and 110, or other network elements, so long as that value is current, and abandoning attempts to do so when the value becomes stale, thus saving the bandwidth that would otherwise be required to do so. The RSUP recognizes that a state value has been delivered and stops consuming bandwidth at that time, and can be used to reliably communicate additional state values other than the state of the network's 100 state machine. Furthermore, the RSUP is tunable via several parameters to trade off the expected latency in delivering a state value against the bandwidth required to do so, and can be adaptable to varying packet loss rates, varying round trip delays between the two network elements, and varying amounts of congestion in the communications path between the two network elements.

Since the gateways 106 and 110 may be required to communicate a new state of the network's 100 state machine to each other upon a state transition, within a given time, and with a given reliability, the initial gateway that recognizes the state transition can determine a number of times to "burst" messages to the other gateway that are indicative of the state transition. The burst of messages can be defined in two ways. First, the burst of messages may be a group of messages, such as ten, and each message can be sent after a pre-determined time interval. Or, second, bursting messages may be defined as sending groups of messages at the pre-determined time interval. For example, a set of three messages may be sent and after the time interval, another set of three may be sent or possibly now a set of five will be sent. The messages here in each group may be sent in rapid succession, or spaced at very small time intervals. Subsequent groups of messages may contain more messages since subsequent messages are only sent if there was no response to the previously sent messages (as described more fully below), therefore, by sending more messages, it is more likely that a response will be sent. Whether the burst of messages is sent as a group or individually, each message may be a replica or copy of each other when sent during the pre-determined time interval. However, after a timeout period, the messages may include additional information (described below). Other examples are possible as well.

The interval between transmissions of messages in the burst can be determined based on the time constraints. It is desirable to send a burst of messages because since an expected delivery time can be determined, then an estimate of how many messages will be lost during transmission can also be computed. And by sending a burst of messages, possibly at evenly spaced time intervals, then even if one or a few get lost, the chances that at least one message will be received is very good.

Figure 3:
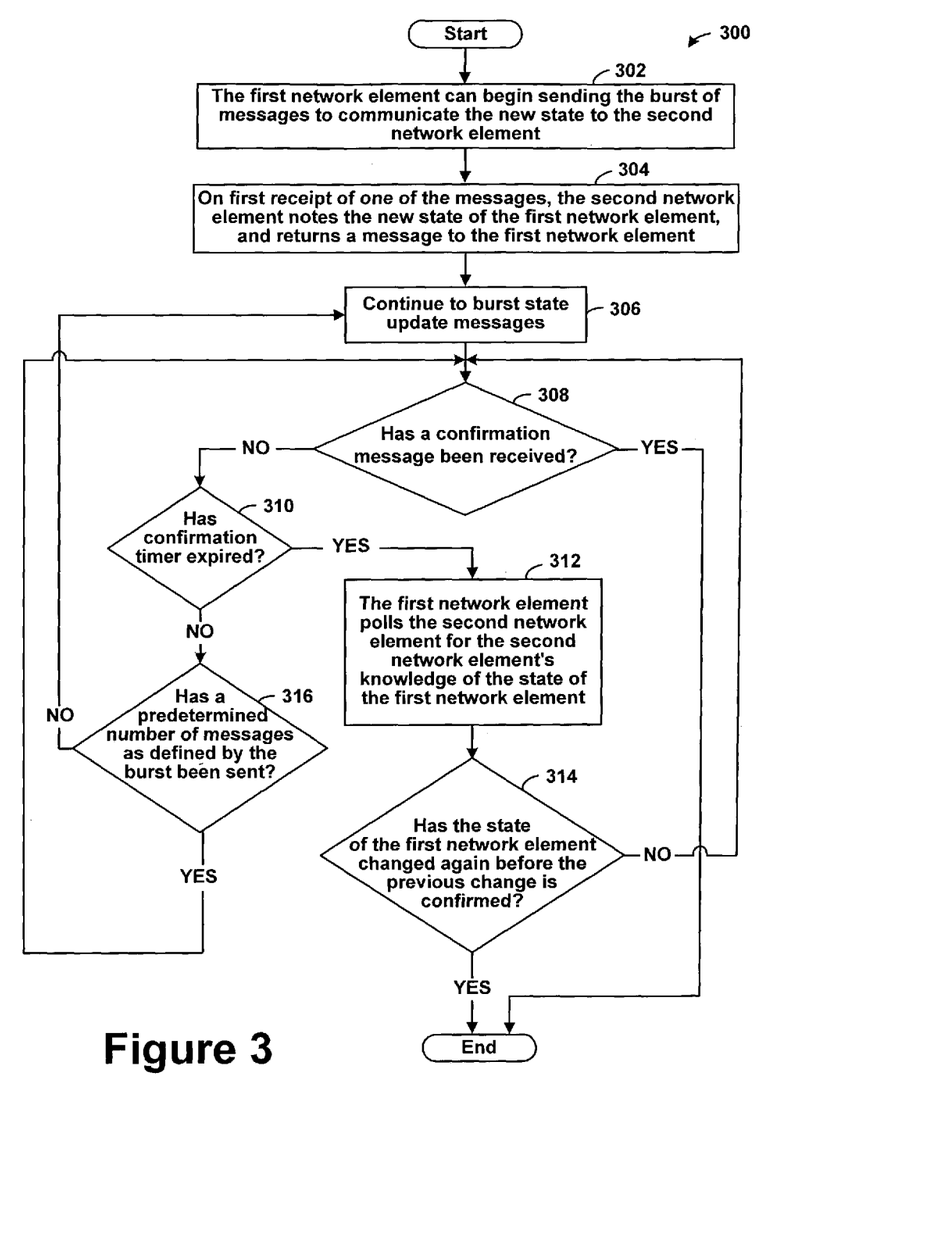
FIG. 3 is a flowchart depicting one embodiment of the reliable state update protocol according to the present invention.

FIG. 3 is a flowchart generally depicting a method 300 of operation of the RSUP. In general, the initial gateway, or a first network element, can begin sending the burst of messages to communicate the new state to the other gateway, or a second network element, as shown at block 302. On first receipt of one of the messages, the second network element notes the new state of the first network element, and returns a message to the first network element giving the state of the second network element and its known state of the first network element, as shown at block 304. The second network element may only confirm receipt of a state update message when the state indicated in the received state update message is different from that last noted. However, the first network element can establish a "must respond" flag within the messages of the burst to indicate to the second network element that an acknowledgement or return receipt message is required.

The first network element may continue to burst state update messages, as shown at block 306, until it has sent a predetermined number defined by the burst or until it receives an acknowledgement message from the second network element confirming that the second network element has received the knowledge of the new state of the first network element. As mentioned, the state update messages from the first network element during the initial burst do not have the must respond flag set in the message. Therefore, if the second network element does not recognize a state change from the state update messages, the second network element will not send a return acknowledgement message.

As shown at block 308, the first network element will wait for a confirmation message. If a confirmation message has been received, the method is terminated. If no confirmation message has been received, and if a confirmation timer (amount of time given to receive a confirmation message) has expired as shown at block 310, then the first network element polls the second network element for the second network element's knowledge of the state of the first network element, as shown at block 312. The polling may occur at a slower rate than during the initial burst. This continues until the second network element indicates the correct state of the first network element. The polling may be accomplished by the first network element sending a must respond message to the second network element, e.g., during this polling after the initial burst, the must respond flags in the polling messages are set to TRUE. The polling may be omitted if the second network element indicates in its confirmation message the desired information.

During the polling, if the state of the first network element changes again before the previous change is confirmed by the second network element, as shown at block 314, then the attempt to communicate the first state change is abandoned and the method may restart so that the second state change will be reliably communicated to the second network element. Alternatively, if the state of the first network element has not changed and a confirmation message has been received, the method is terminated.

If the confirmation timer has not expired as shown at block 310, and a predetermined number of messages as defined by the burst has been sent, as shown at block 316, then the first network element checks for a confirmation message again. However, if the predetermined number of messages has yet to be sent, the first network element continues to burst state update messages.

As the method 300 of FIG. 3 illustrates, the first network element will continue to send update messages to the second network element until a confirmation message has been received. Therefore, the new state will be indicated to the second network element. Thus, the method 300 is a reliable update protocol.

In detail, each network element may operate using the RSUP by maintaining three variables: "lcl.state," which contains the value of the state of the network's 100 state machine; "rmt.state," which contains the last value received of the state of the other network element; and "rmt.ack," which contains the last value of the state of the network element that has been acknowledged as having been received by the other network element.

Each state update packet message may contain the current value of the state of the network element sending the packet (i.e., the current value of the variable lcl.state), the last received value of the state of the other network element (i.e., the current value of the variable rmt.state, which is used to acknowledge receipt of state update packets sent by the other network element), and a must respond flag that can be set to TRUE or FALSE, which is used to recover from lost acknowledgments from the receiving network element.

Two timers control update packet message transmission and retransmission during the burst of messages. One timer, referred to as "T0," is used to recover from lost state update packets sent to the other network element and defines the time interval between messages of the burst. So, during the burst of messages, a message is sent every T0 seconds or a burst of messages is sent every T0 seconds. The other timer, referred to as "T1," is used to recover from lost acknowledgement packets sent by the other network element. T1 defines a time interval after which another burst of messages may be sent by the network element, and this burst of messages may again be sent according to the T0 intervals. Data packet messages sent because the T1 time interval expired may have the must respond flag set to TRUE, in order to indicate to the receiving element that a response is necessary so that the sending network element may stop sending the update packet messages. When the timers are a non-zero value, they decrease toward zero in real time, stopping when they reach zero. Timer T0 is initially set to a value "T0interval," and timer T1 is initially set to a value "T1interval."

When a network element transitions into a new state, the network element initially sends a state update packet (either by bursting a group of messages or sending multiple individual messages at predefined intervals) containing the current value of the variables lcl.state and rmt.state to the other network element (to indicate the new state and to indicate the network element's known state of the other network element), with the must respond flag set to FALSE (to disable the must respond flag). The must respond flag is set to FALSE because the other network element is initially given a chance to respond. Moreover, the must respond flag is set to FALSE in the messages sent during this burst because the network element does not need to receive numerous return response messages. Rather, the receiving network element will respond if it notices a change in the state indicated in the update message as compared to its knowledge of the state.

The sending network element sets timer T0 to the initial T0interval value and timer T1 to the initial T1interval value. And when timer T0 decrements to zero and the current value of the state of the network element (i.e., the current value of the variable lcl.state) is not equal to the last value acknowledged as having been received by the other network element (i.e., the current value of rmt.ack), then the network element sends another state update packet to the other network element exactly as previously sent except that the T1 timer is not reset. And if the value of the timer T1 is zero, then the network element has sent all the messages in the burst and the network element will begin retransmitting a burst of messages except the must respond flag is set to TRUE in these messages. The current value of the lcl.state variable will not be equal to the current value of the rmt.ack variable until the network element receives a confirmation message indicating that the update packet message was received and read properly by the receiving network element.

It is likely that only one message of the second set of burst messages will be sent (depending on the round trip delay ("RTD") time), in the event that timer T1 expires, because since the messages sent after T1 expires have the must respond flag set to TRUE, then the receiving network element will respond once it receives the message. So, as long as the message is not lost, then the sending network element will receive a confirmation message and abandon sending the remainder of the burst of messages. If the receiving network element can respond to the sending network element within the T0 time interval, then the sending network element will only send one message during the second burst of messages.

Upon receipt of a state update message from the network element, the other network element will determine if the message is duplicated or out of sequence by using the Real Time Protocol ("RTP") header sequence number, for example, assuming that the RSUP is being used over RTP; if it is being used directly over, e.g., UDP then "RTP-like" sequence numbers could be added to the RSUP messages.

The message will be recognized as a duplicate if the receiving network element has received a previous update message from those sent in the burst. However, if none of the previous state update messages have been received, possibly because they were lost or misread by the network element, then the message will not be recognized as a duplicate.

If the message is a duplicate or is out of sequence, the other network element will ignore the message. If the message is new and in sequence, then the message probably contains a new value of the state of the initial network element. The message may also be recognized as a new message even if the message contains the same state information as a previous message if the message's must respond flag is set to TRUE. When the other network element recognizes the message as new, it may send a confirmation state update message back to the initial network element in the same manner as the first state update message was sent. Alternatively, the other network element may simply send one confirmation to the sending network element.

If the network elements need to communicate additional information beyond just their states, that additional information can be added to the state update packets that are sent to each other. If the information is valid only in certain states, then it only needs to be included in state update packets encoding the desired state. Additionally, once the other network element has acknowledged a certain state, the additional information does not need to be sent again until the state of the network element leaves and re-enters that state. (This is generally an issue of appropriate state machine design, not verification of the condition by the protocol procedures.)

The state machine of the network 100 may be designed according to rather severe timing constraints. For example, when two modems attempt to connect, strict timing constraints must be met in order for the modems to successfully connect. When the modems connect via MoIP gateways communicating over a packet network, signals between the modems are sent according to state transitions in the MoIP gateways. In this case, the RSUP, operating over the packet network, must meet the timing constraints.

The latency of the RSUP in delivering state updates is governed by the T0interval value. It can be appropriately chosen based on the timing constraints and certain packet network characteristics. For example, a given packet network may be characterized as a lossy packet network, which may lose or misappropriately deliver data packets. Therefore, a data packet may need to be sent a number of times in order to be sure that it will be received. Meeting timing constraints with a given level of probability may require analyzing moments of distributions higher than the first (e.g., the mean, average, or expected value). Here, the expected value of the time interval from the first transmission of a state update packet to its successful reception by the other network element of the system is analyzed and can be defined as follows.

| Let: | be: |
|---|---|
| p | the probability that a packet sent by one element or system through the packet network will be successfully received by the other element or system. |
| $E(n) = \dfrac{1}{p}$ | the expected number of times that a packet must be (re)transmitted by one element or system before it is successfully received by the other. |
| RTD | the round trip delay through the packet network between the two elements or systems. |
| $OWD \approx \dfrac{RTD}{2}$ | the one way delay through the packet network from one element or system to the other. |
| E(t) | the expected time interval between the first transmission of a packet by one element or system and its successful reception by the other. |
| $\dfrac{OWD}{E(t)}$ | OWD normalized with respect to the E(t). |
| $\dfrac{T0interval}{E(t)}$ | T0interval normalized with respect to E(t). |

Equation 1 (Eq. 1) below represents the expected time interval between the first transmission of a packet by one element or system and its successful reception by the other.

$$E(t) = OWD + T0interval \times E(n) \quad \text{Eq. 1}$$

And Eq. 1 can be reduced (as shown through Equations 2 and 3) to Equation 4 (Eq. 4) as shown below, which represents an estimate of the normalized T0interval.

$$E(t) = OWD + \frac{T0interval}{p} \quad \text{Eq. 2}$$

$$T0interval = p \times (E(t) - OWD) \quad \text{Eq. 3}$$

$$\frac{T0interval}{E(t)} = p\left(1 - \frac{OWD}{E(t)}\right) \quad \text{Eq. 4}$$

Figure 4:
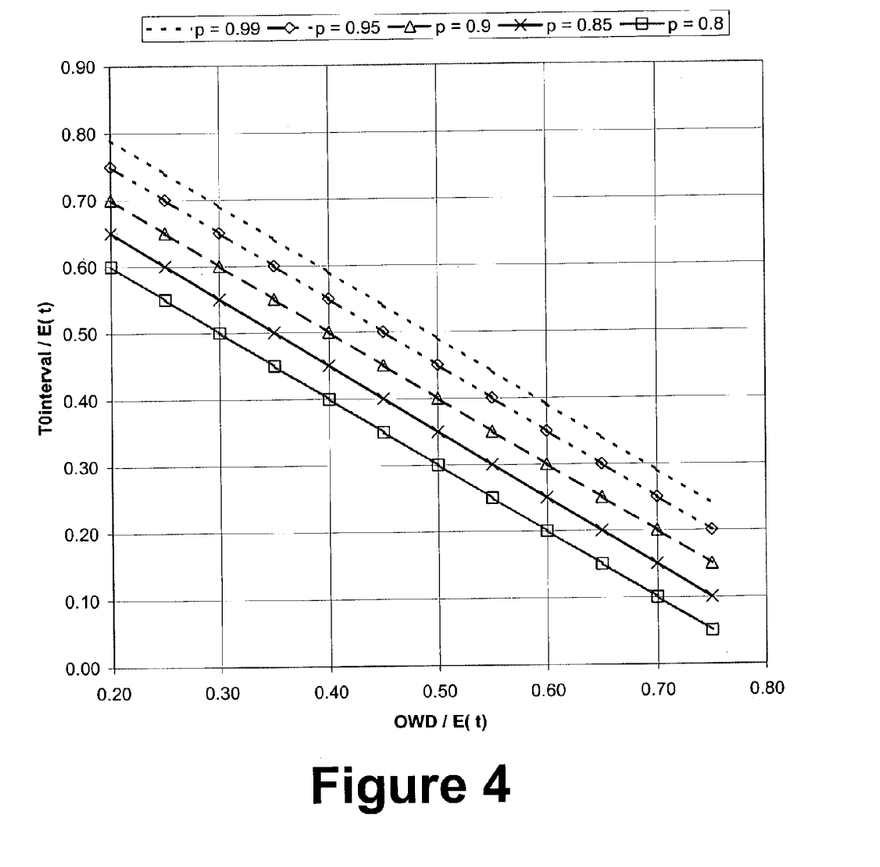
FIG. 4 illustrates an example of a graph of values of the time interval between data packets in the initial burst of messages as a function of one way delay times both normalized with respect to the desired delivery time of the state update message.

FIG. 4 illustrates a graph of values of $$\frac{T0interval}{E(t)}$$

as a function of $$\frac{OWD}{E(t)}$$

for several values of p. As shown, as OWD (i.e., the one way delay through the packet network from one element or system to the other) increases, the T0interval decreases since packets will have to be sent more frequently to meet the timing constraints because the delivery time dominates the constraint. As the probability increases, the T0interval increases as well because less data packets will have to be sent within the T1interval because it is more likely that a data packet will be received, so the time between the messages sent in the burst is increased. Therefore the value of T0interval can be selected according to the probability of receiving a packet and according to the one way delivery time. As one example, a group burst of 3, 5, and 7 messages may be sent with the individual groups sent spaced at time intervals in the range of 10-20 ms time intervals.

As another example, T0interval can be determined according to T1interval, since the amount of messages sent within the T1interval time period depends on the spacing between messages sent, which is defined by T0interval.

While expected latency is a function of T0interval, the bandwidth required to achieve a given expected latency is primarily a function of T1interval. If T1interval is too large, the network element will send unnecessary state update packet messages with the must respond flag set to FALSE in attempting to recover from a lost acknowledgment to a packet (that had the must respond flag set to FALSE). If T1interval is too small, the other network element will send unnecessary acknowledgements in response to state update packets with the must respond flag set to TRUE when the other network's acknowledgment of a successfully received state update packet with the must respond flag set to FALSE could not yet have possibly reached the first network element because of the round trip delay. An approximate value for T1interval is the measured round trip delay time between the two network elements. As one example, a rough estimate of T1interval could be in the range of 500 ms-1 s.

FIGS. 5-9 illustrate embodiments of message flow diagrams between two systems or entities that operate according to state machines that have three states, denoted 0, 1, and 2. Each system's state machine's state is communicated to the other entity, but does not affect the other system's state machine's operation. Messages are shown as arrows coming into each system. Messages shown entering the systems from the left side of system A or from the right side of system B are sent from communication devices causing a change in the respective system's state. The values of the three variables in each system over time are given in each system's column. The values of the variables represent states, and the order of the variables represents the states as known by the systems. For example, the order of the variables in system A indicates, from left to right, the state of system A, the state of system B, and the state of system A as known by system B. And the order of the variables in system B indicates, from left to right, the state of system B, the state of system A, and the state of system B as known by system A. State update packets are shown as arrows between the two systems, with lost packets indicated by arrows that do reach all the way to the receiving system. Time intervals in which timers T0 and T1 are running are shown and labeled respectively, but only intervals where the timers decrement to zero and affect protocol operation are shown.

Figure 5:
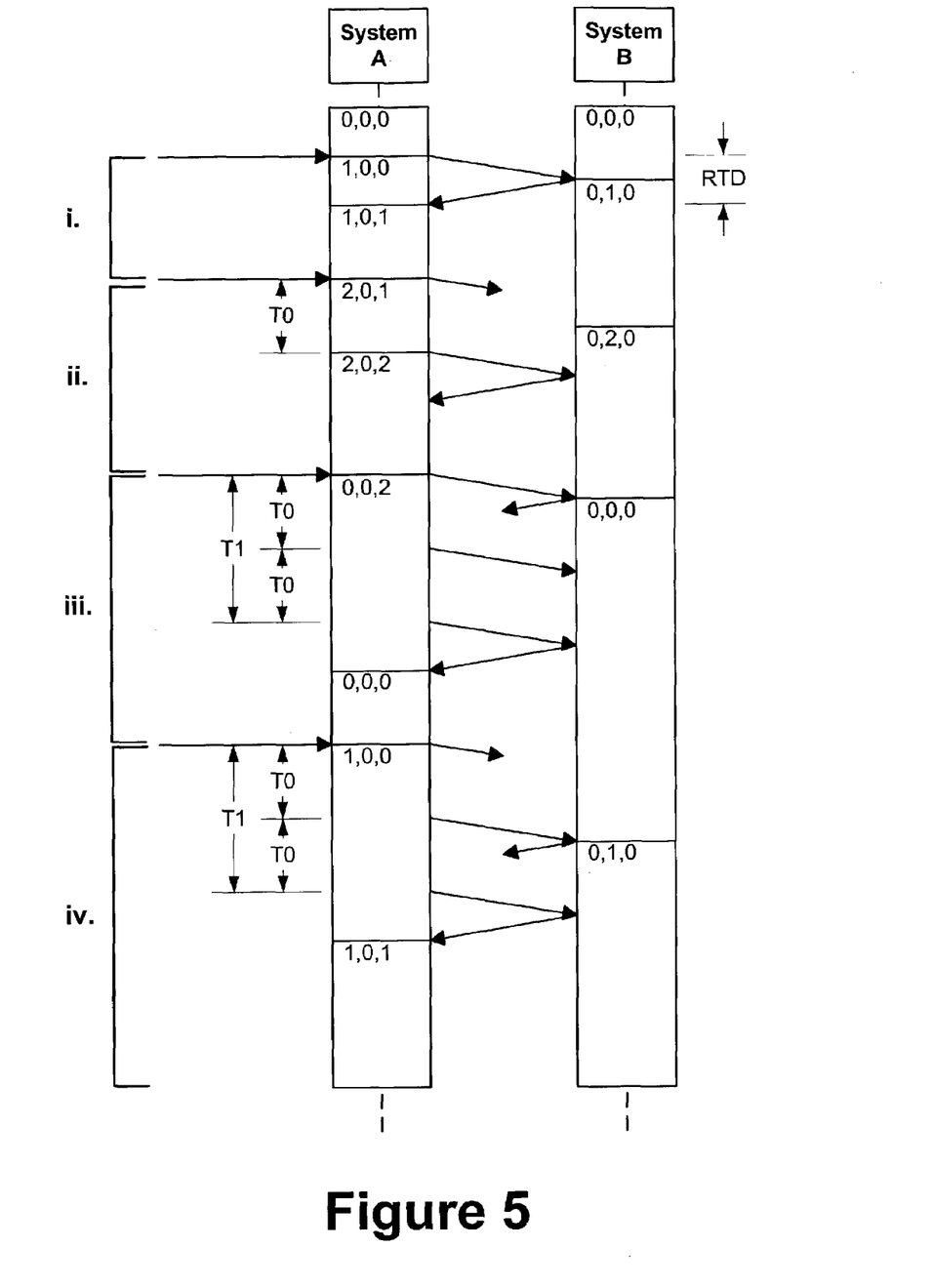
FIGS. 5-9 illustrate embodiments of message flows between two entities that operate according to state machines that have three states according to the present invention.

FIG. 5 illustrates four (i-iv) examples of message flow sequences between systems A and B. The examples illustrated in FIG. 5 operate according to T1interval>T0interval>RTD.

Example (i) illustrates system A receiving an indication from a device, which causes the system's state to change from "0" to "1." System A then sends an update message to system B, which receives the update message, notes the change of state (indicated by the variable change), and sends a confirmation message to system A to indicate that the update message was received and to indicate what state system B believes system A is in. In this example, system A receives the confirmation message and notes that system B believes system A in is state "1."

Example (ii) illustrates system A receiving another indication from the device, which causes the state of system A to change again to state "2." System A then sends an update message to system B, but in this example, the update message was lost during transmission. And after T0interval expires, system A then sends another update message to system B, since system A had not received a confirmation message yet. System B then receives the second update message, notes the change of state, and sends a confirmation message to system A. System A then receives this confirmation message and notes the state that system B has recorded for system A.

Example (iii) illustrates system A receiving yet another indication from the device which causes the state of system A to change back to state "0." System A sends the update message to system B, which receives the message, notes the change of state, and sends a confirmation message to system A. However, in this example, the confirmation message is lost during transmission. Therefore, after timer T0interval expires, system A sends another state update message to system B since system A never received a confirmation message. System B receives this second update message, and since this update message does not indicate a change in system A's state from that which system B believes system A is currently in, then system B will do nothing. This results because system B already noted the change in state from the previous update message. Therefore, system A will continue sending update messages (not shown) at the T0 time interval to system B with no response from system B. However, after timer T1interval expires, system A will then send another update message to system B, but this time the update message will have a must respond flag set. So when system B receives this message, it sends a confirmation message to system A, who then receives it and notes the state information from system B.

Example (iv) illustrates system A changing state and sending an update message to system B, which gets lost during transmission. Therefore, after timer T0interval expires, and since no confirmation message was received yet, system A sends another update message, which is received by system B. System B then notes the change in state, and sends a confirmation message to system A, which is also lost during transmission. Therefore, after timer T1interval expires, and since no confirmation message has been received yet, system A sends another update message to system B, but this time with the must respond flag set. Then system B receives this update message and responds by sending another confirmation message to system A, which receives the message and notes the state changes.

Figure 6:
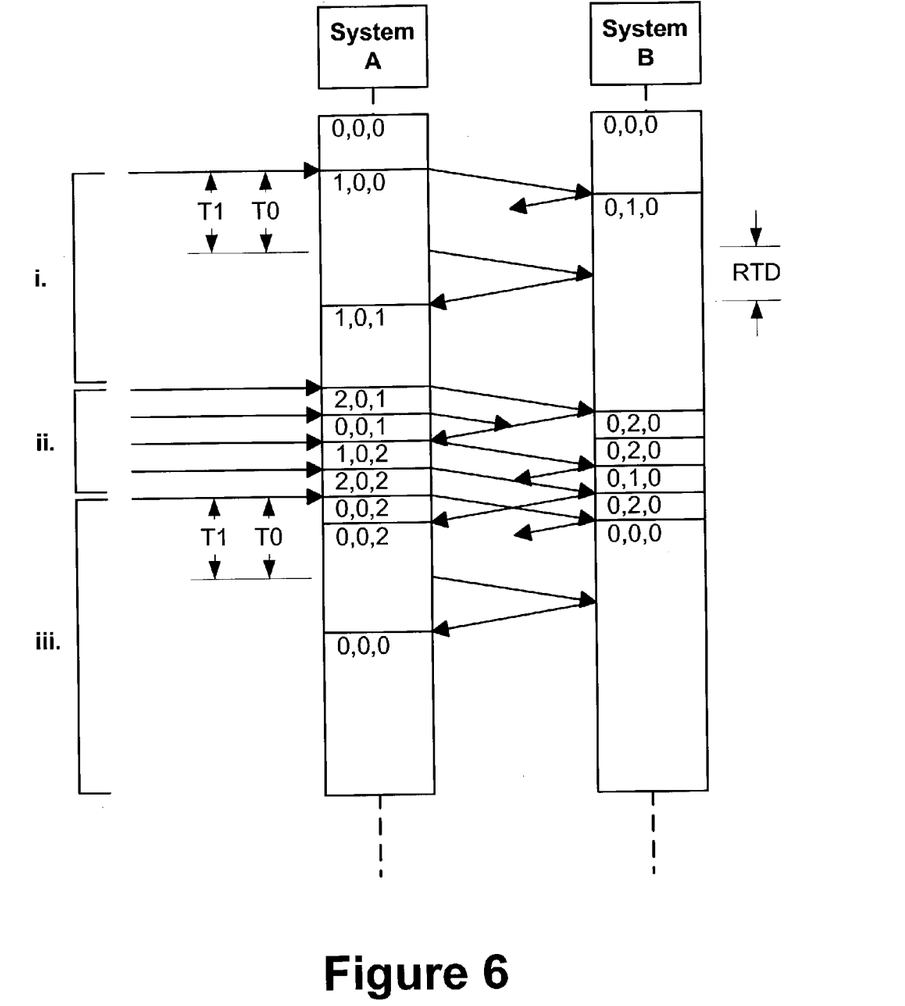

FIG. 6 illustrates three examples (i-iii) of message flow sequences between systems A and B. The examples illustrated in FIG. 6 operate according to T1interval=T0interval>RTD. Here, bandwidth conservation has been traded off against expected latency.

Example (i) illustrates system A receiving a message causing its state to change and an update message to be sent to system B. System B receives the update message, notes the state change, and sends a confirmation message, which gets lost during transmission. After timer T0 expires, and in this example T1 expires at the same time, system A sends another update message this time with the must respond flag set to true. System B receives this update message and responds with a confirmation message that is received by system A.

Example (ii) illustrates a flurry of messages sent to system A causing system A's state to rapidly change. Upon receiving each message in the bunch, system A sends an update message to system B abandoning an attempt to inform system B of the previous state transition. Since the update messages sent by system A occur before acknowledgement or receipt of a confirmation message of the state transition of which the previous update message triggered from system B (because the change in state occurred in a time period less than the RTD), then the state indications within each system are not always accurate. Example (ii) also illustrates an update message and a confirmation message lost during transmission.

Example (iii) illustrates a situation similar to example (i). Example (iii) illustrates that at a steady state, or after the flurry of messages, each system will have correct knowledge of the states of each other.

Figure 7:
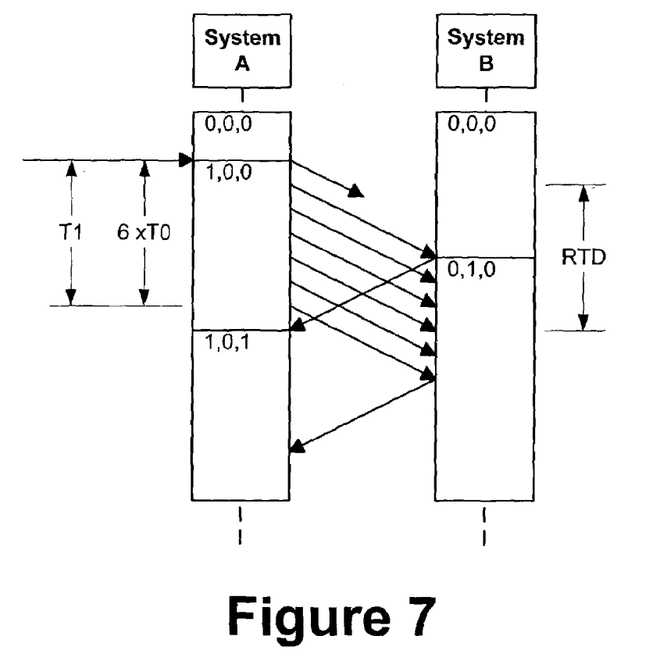

FIG. 7 illustrates an indication received by system A causing system A's state to change. Here, T1interval=RTD>>T0interval, and expected latency has been traded off against bandwidth conservation. After system A's state changes, it sends an update message to system B, which is shown as lost during transmission. So system A sends another update message to system B after timer T0interval expires. And since RTD≈6×T0interval, then six update messages will be sent to system B before system A will have the opportunity to receive a confirmation message from system B. This may be beneficial because even in a lossy transmission network, at least one of the six messages should be received by system B. And sending 6 messages does not cause a burden on system B because once system B receives one message, notes the change in state and sends off a confirmation message, system B will just ignore the subsequent messages because they will not indicate any new information to system B. FIG. 7 also illustrates timer T1 expiring prior to receiving the confirmation message, so system A sends another update message with the must respond flag set and system B then receives this message and sends another confirmation message to system A.

Figure 8:
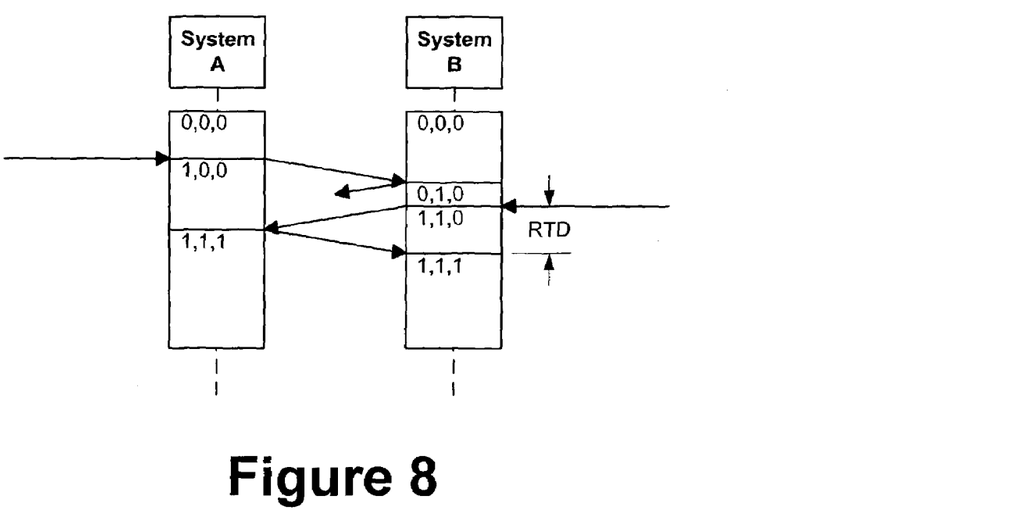

FIG. 8 illustrates messages received by both systems. Again, T1interval=T0interval>RTD. In this example, system A has received an indication from a device causing system A's state to change and causing an update message to be sent to system B. System B receives the update message, notes the change, and sends a confirmation message to system A, which gets lost during transmission. While T0interval is still running, system B receives an indication from a device causing its state to change, so system B sends an update message to system A. This update message performs as a confirmation message for the update message sent from system A, since every update message sent may include the state of the system sending it and the state of the receiving system as seen by the sending system. This update message also serves to inform system A of system B's state transition. So, system A will receive this update message and note the change of the state of system B and note that system B received its update message.

Figure 9:
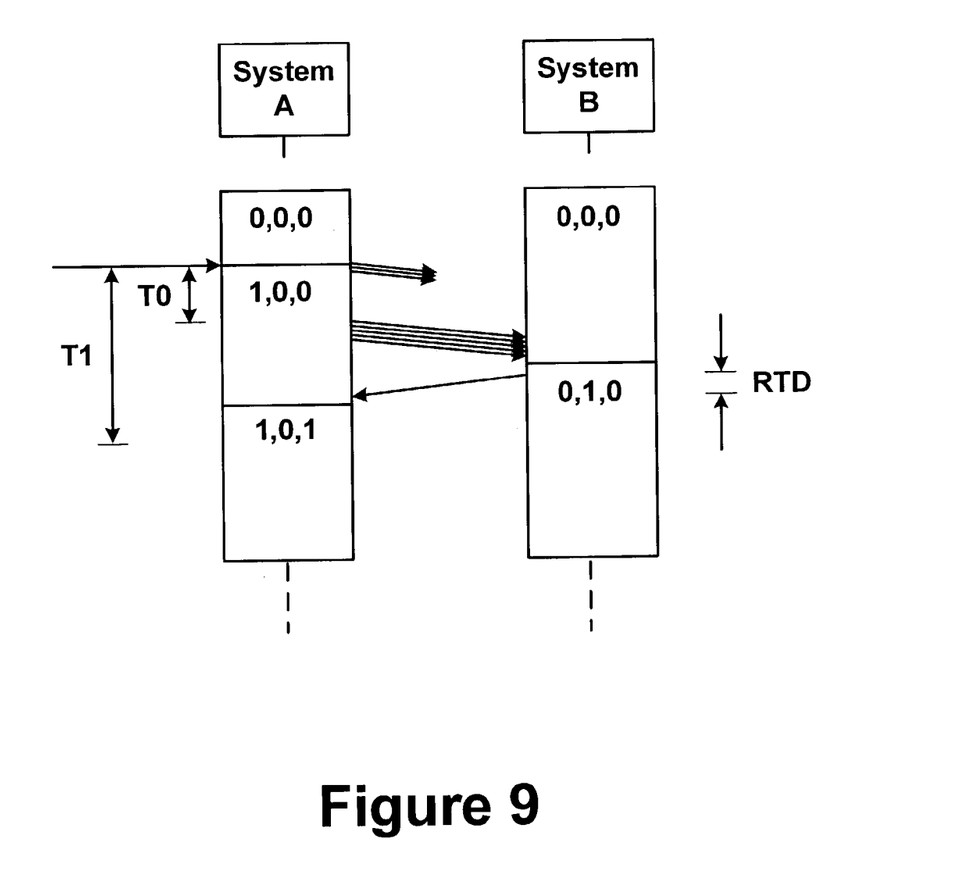

FIG. 9 illustrates system A sending a burst of update messages to indicate to system B that system A has undergone a state transition. Here, T1interval>T0interval>RTD. System A initially undergoes a state transition and sends a group of three state update messages in rapid succession to system B, hoping that at least one of the three will reach system B. However, in this example, all three messages are lost during transmission, therefore after timer T0interval expires, system A sends another group of state update messages in rapid succession to system B. The second group contains five update messages to increase the probability that system B will receive at least one of them. In this instance, system B receives all five, notes the state transition change, and sends only one return confirmation message to system A. This method of bursting messages may be beneficial in a lossy packet network.

FIGS. 5-9 illustrate many examples of operation of the RSUP. However, the RSUP may operate as desired by setting the timers accordingly or modifying the RTD.

While the invention has been described in conjunction with presently preferred embodiments of the invention, persons of skill in the art will appreciate that variations may be made without departure from the scope and spirit of the invention. For example, the RSUP described may be employed to communicate state changes between any two systems or devices. Additional or alternate information can also be communicated between entities using the RSUP. The true scope and spirit of the present invention is defined by the appended claims, which may be interpreted in light of the foregoing.

I claim:

1. A method of communicating state information between a first entity and a second entity, the method comprising:
   (a) sending a first message containing state information from the first entity to the second entity, wherein the first message comprises a state of the first entity, a value indicating the first entity's current known state of the second entity, and a value indicating a current known state of the first entity that has been acknowledged as having been received by the second entity;
   (b) if after a first time interval, no confirmation message has been received by the first entity from the second entity, resending the first message from the first entity to the second entity;
   (c) repeating step (b) until the confirmation message has been received by the first entity from the second entity or until a second time interval expires, wherein the second time interval is at least equal to the first time interval;
   (d) if after the second time interval expires and no confirmation message has been received by the first entity from the second entity, resending the first message from the first entity to the second entity requiring the second entity to send the confirmation message; and
   (e) if during any of steps (a)-(d) a second message containing updated state information is available before the confirmation message has been received by the first entity, terminating the sending of the first message and sending the second message in accordance with steps (a)-(d).

2. The method of claim 1, wherein step (a) further comprises sending a group of copies of the first message in rapid succession from the first entity to the second entity.

3. The method of claim 2, wherein step (c) comprises repeating step (b) by sending subsequent groups of copies of the first message.

4. The method of claim 1, further comprising the second entity receiving the first message from the first entity and noting the state of the first entity.

5. The method of claim 4, wherein the confirmation message is indicative of a current state of the second entity and a value indicating the second entity's current known state of the first entity.

6. The method of claim 1, wherein sending the state update message comprises sending a message indicative of a state selected from the group consisting of an audio mode, a voice band data (VBD) mode, a modem relay mode, a facsimile relay mode, and a text relay mode.

7. The method of claim 1, wherein the first entity and the second entity are selected from the group consisting of a gateway and a MoIP gateway.

8. The method of claim 1, wherein step (b) comprises if after the first time interval, no confirmation message has been received by the first entity from the second entity, sending a group of copies of the first message from the first entity to the second entity in rapid succession.

9. The method of claim 1, wherein the second time interval is at least equal to a round trip delay.

10. A system comprising:
a first communication device;
a second communication device in communication with the first communication device, wherein the first communication device sends a burst of messages to the second communication device and, after a timeout period, if the first communication device has not received a response from the second communication device, the first communication device sends a message to the second communication device, wherein the message requires that the second communication device respond, and wherein the first communication device sends all messages of the burst of messages to the second communication device in rapid succession, wherein the first communication device sends the burst of messages to the second communication device upon a state transition and to indicate the state transition, wherein each message of the burst of messages indicates a state transition of the first communication device; and
a network device in communication with the first communication device and wherein the first communication device sends the burst of messages to the second communication device in response to receiving data from the network device causing the state transition of the first communication device.

11. The system of claim 10, wherein the first communication device and the second communication device are selected from the group consisting of a gateway and a MoIP gateway.

12. The system of claim 10, wherein the second communication device is in communication with the first communication device through a packet network.

13. The system of claim 10, wherein the first communication device sends messages of the burst of messages spaced by a time interval.

14. The system of claim 13, wherein the timeout period is a length of time at least equal to the time interval.

15. The system of claim 10, wherein the second communication device sends a confirmation message to the first communication device in response to one of the messages of the burst.

16. The system of claim 10, wherein the second communication device sends a confirmation message to the first communication device in response to the message.

17. The system of claim 10, wherein if the first communication device transitions into a different state and the first communication device has not received the response from the second communication device, the first communication device terminates sending the burst of messages and the message to the second communication device and sends a second burst of messages indicating the different state.

18. The system of claim 10, wherein the first communication device may transition to a state selected from the group consisting of an audio mode, a voice band data (VBD) mode, a modem relay mode, a facsimile relay mode, and a text relay mode.

19. The system of claim 10, wherein the first communication device synchronizes data transmission with the second communication device.

20. The system of claim 10, wherein the first communication device maintains values selected from the group consisting of a value of a state of the first communication device, a value of a state of the second communication device, and a value of a state of the first communication device as known by the second communication device.

* * * * *